US012621832B2

(12) United States Patent
Bae et al.

(10) Patent No.: US 12,621,832 B2
(45) Date of Patent: May 5, 2026

(54) METHOD AND DEVICE FOR TRANSMITTING/RECEIVING WIRELESS SIGNAL IN WIRELESS COMMUNICATION SYSTEM

(71) Applicant: LG Electronics Inc., Seoul (KR)

(72) Inventors: Duckhyun Bae, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 625 days.

(21) Appl. No.: 17/608,629

(22) PCT Filed: May 4, 2020

(86) PCT No.: PCT/KR2020/005912
§ 371 (c)(1),
(2) Date: Nov. 3, 2021

(87) PCT Pub. No.: WO2020/226403
PCT Pub. Date: Nov. 12, 2020

(65) Prior Publication Data
US 2022/0217715 A1      Jul. 7, 2022

(30) Foreign Application Priority Data

May 3, 2019      (KR) ........................ 10-2019-0052192

(51) Int. Cl.
*H04W 72/21*      (2023.01)
*H04L 1/1812*      (2023.01)
*H04L 1/1829*      (2023.01)

(52) U.S. Cl.
CPC .......... *H04W 72/21* (2023.01); *H04L 1/1812* (2013.01); *H04L 1/1854* (2013.01)

(58) Field of Classification Search
CPC .... H04W 72/21; H04W 72/23; H04L 1/1812; H04L 1/1854; H04L 1/1896
See application file for complete search history.

(56) References Cited

U.S. PATENT DOCUMENTS

2019/0082454 A1      3/2019   Shi et al.
2019/0349135 A1*     11/2019  Xu .......................... H04L 1/188
2021/0345366 A1*     11/2021  Ying ................. H04W 72/0453

FOREIGN PATENT DOCUMENTS

WO      WO2019028276        2/2019

OTHER PUBLICATIONS

3rd Generation Partnership Project, "Technical Specification Group Radio Access Network; NR; Medium Access Control (MAC) protocol specification (Release 15)," 3GPP TS 38.321, V15.5.0, dated Mar. 2019, 80 pages.

(Continued)

*Primary Examiner* — Mandish K Randhawa
(74) *Attorney, Agent, or Firm* — Fish & Richardson P.C.

(57) ABSTRACT

The present invention relates to a wireless communication system, and may comprise receiving a first transport block in a first semi-persistent scheduling (SPS) resource allocated for an SPS operation, receiving scheduling information that indicates the retransmission of the first transport block, and receiving, based on a processing time of a user equipment, the first transport block (TB) in one or more second SPS resources using a hybrid automatic repeat request (HARQ) process related to the first SPS resource.

5 Claims, 10 Drawing Sheets

(56)  References Cited

OTHER PUBLICATIONS

Ericsson, "Support for Shorter DL SPS Periodicities," R1-1904132, 3GPP TSG RAN WG1 Meeting #96bis, Xi'an, China, Apr. 8-12, 2019, 5 pages.

PCT International Search Report and Written Opinion in International Appln No. PCT/KR2020/005912, dated Aug. 24, 2020, 13 pages.

Wilus Inc., "On Shorter SPS PDSCH Periodicity for NR URLLC," R1-1905434, 3GPP TSG RAN WG1 #96bis, Xi'an, China, Apr. 8-12, 2019, 4 pages.

* cited by examiner

[FIG. 1]
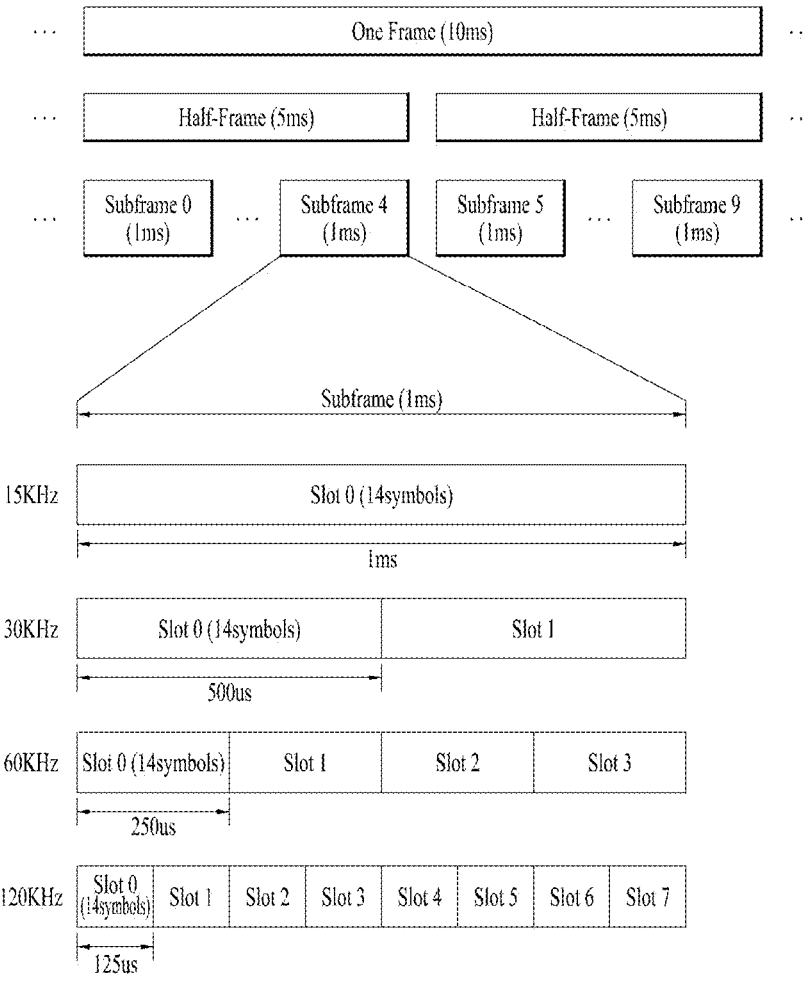

[FIG. 2]
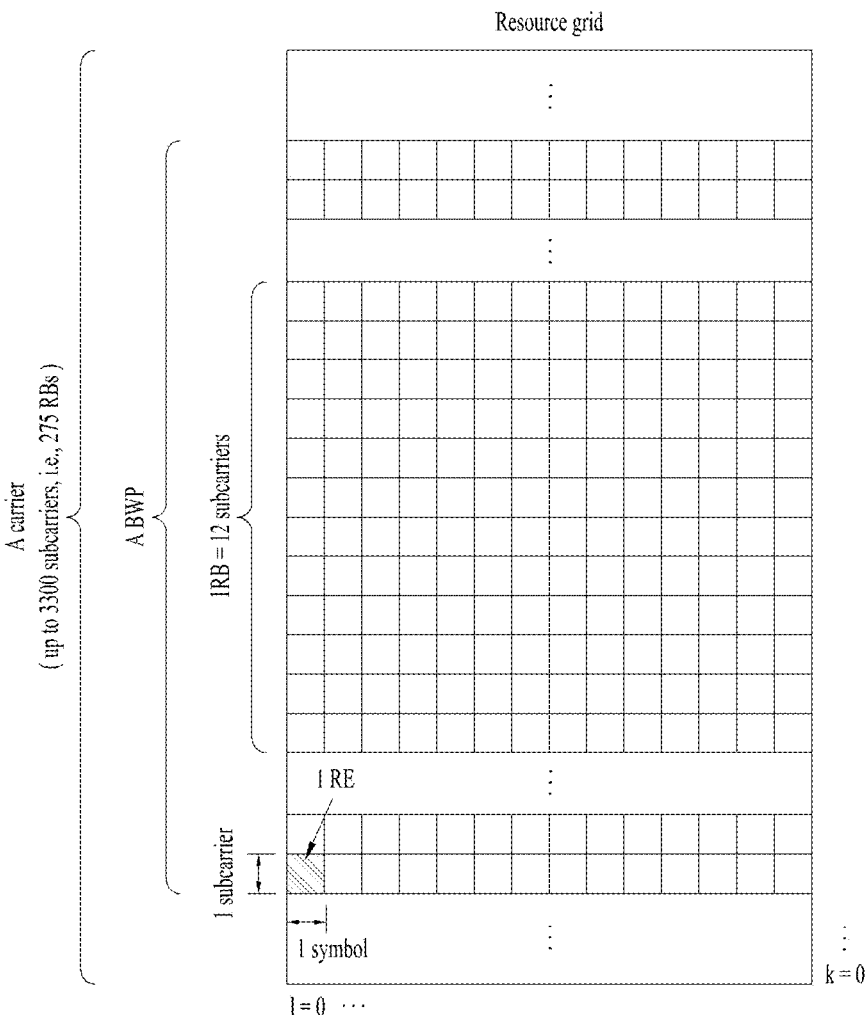

[FIG. 3]
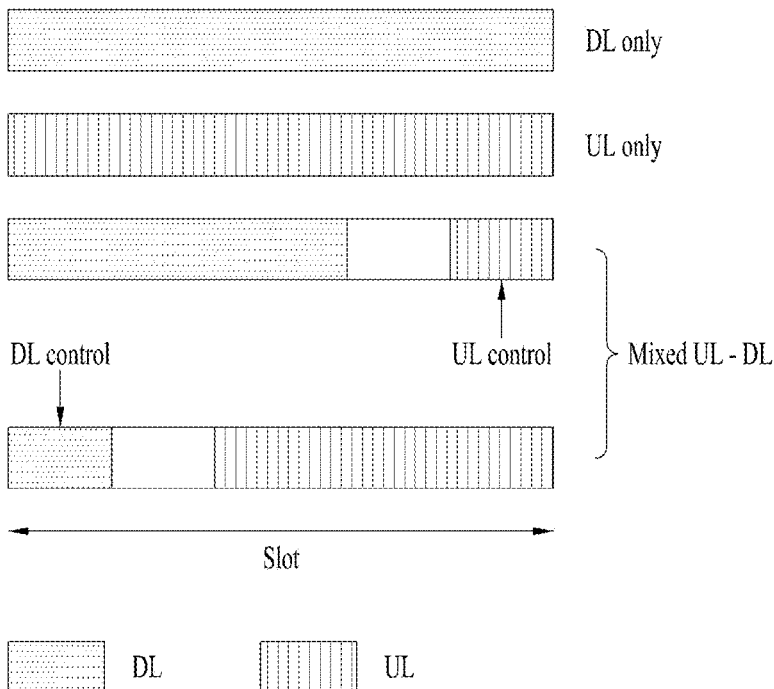

[FIG. 4]
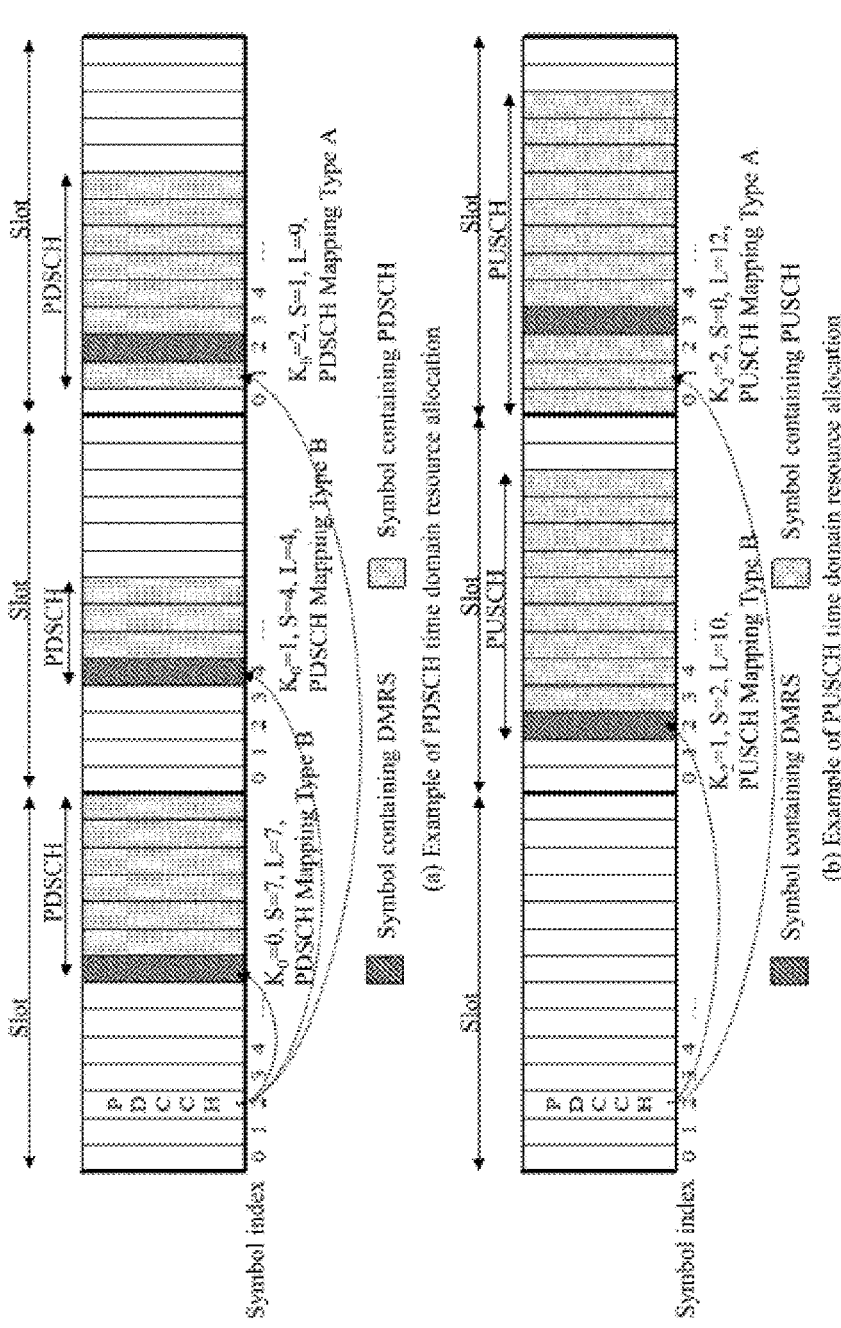

[FIG. 5]
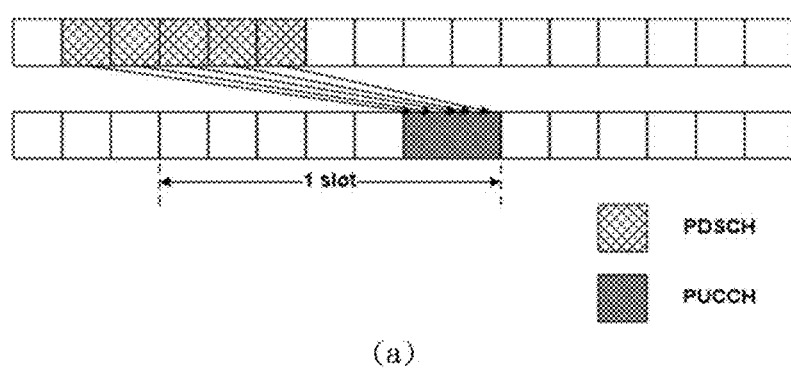
(a)
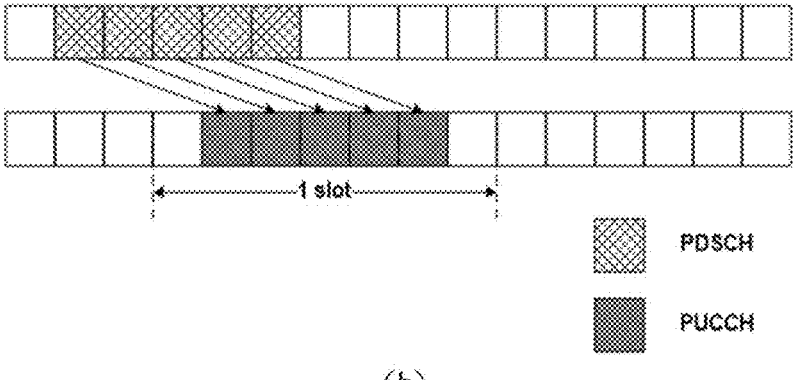
(b)

[FIG. 6]
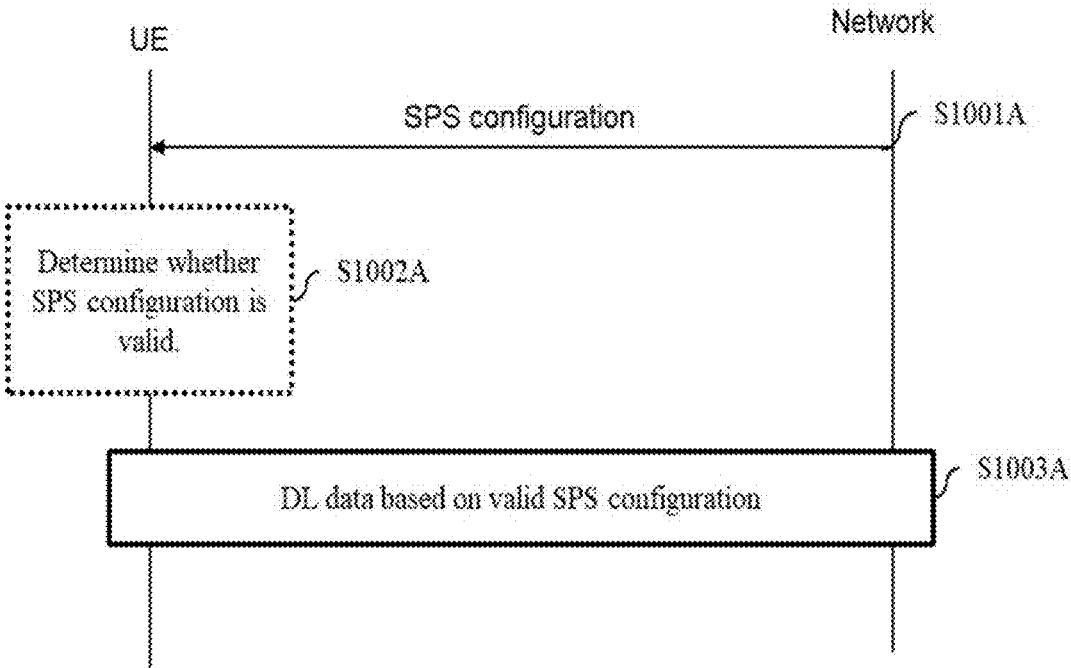
[FIG. 7]
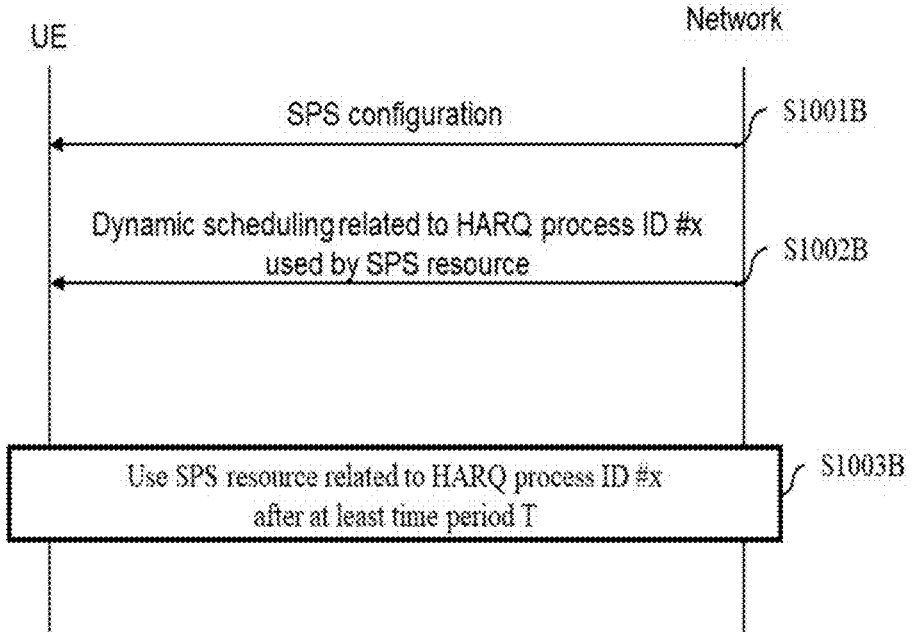

[FIG. 8]
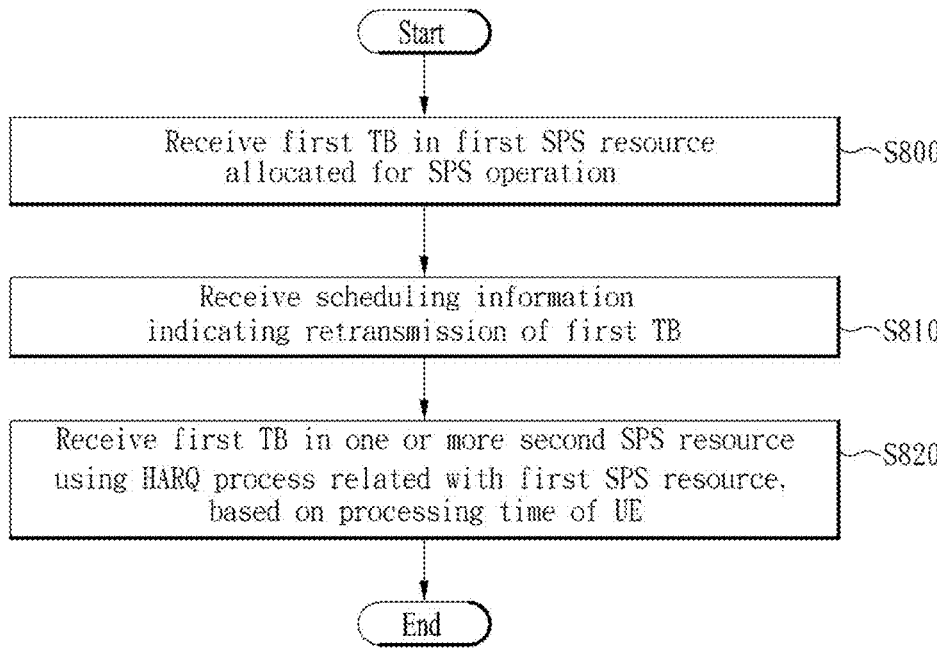
[FIG. 9]
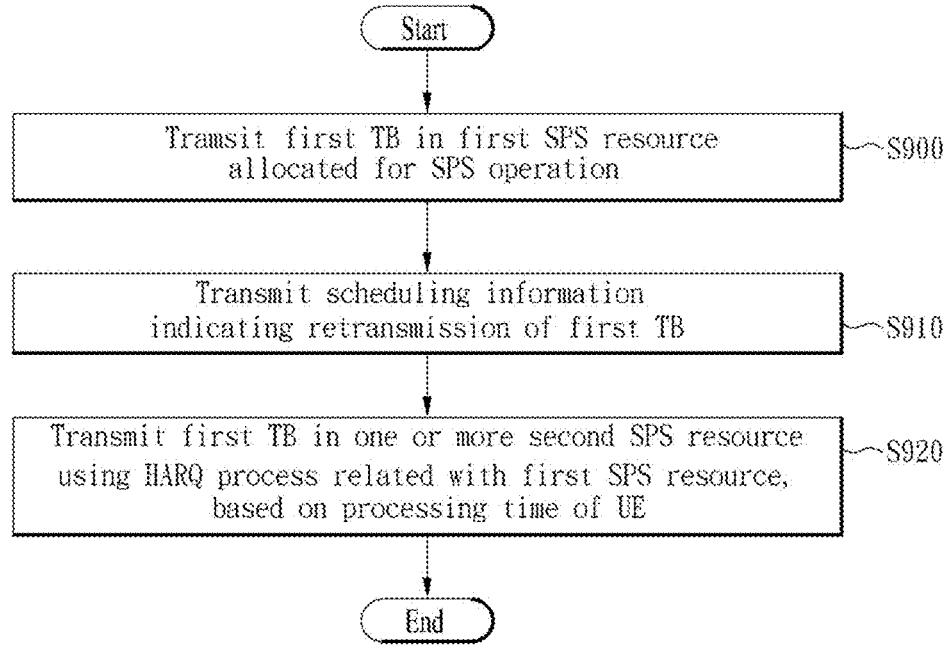

[FIG. 10]
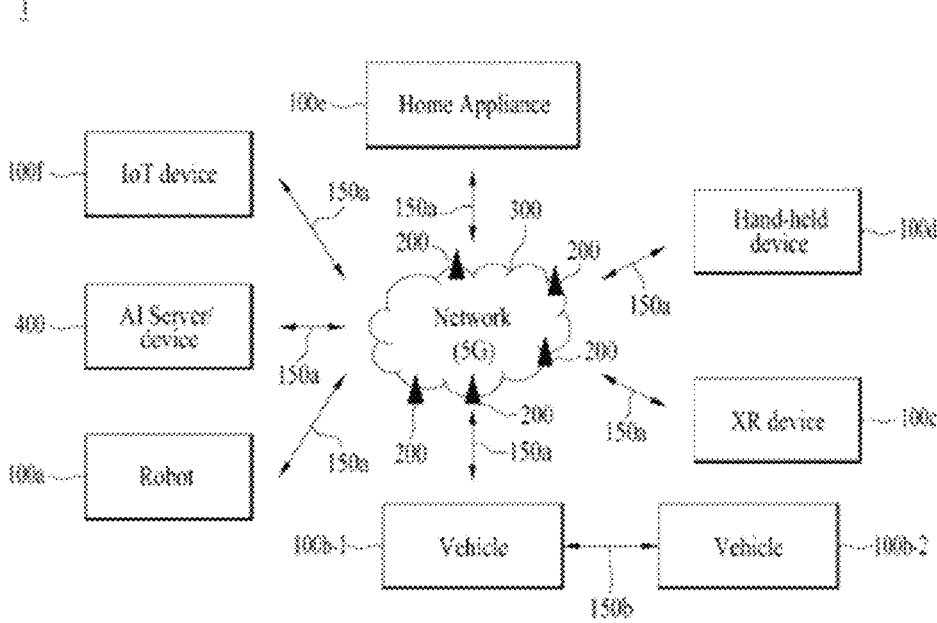
[FIG. 11]
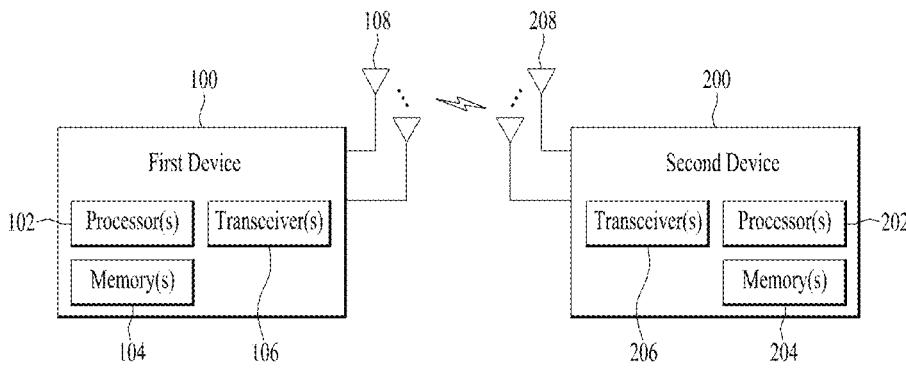

[FIG. 12]

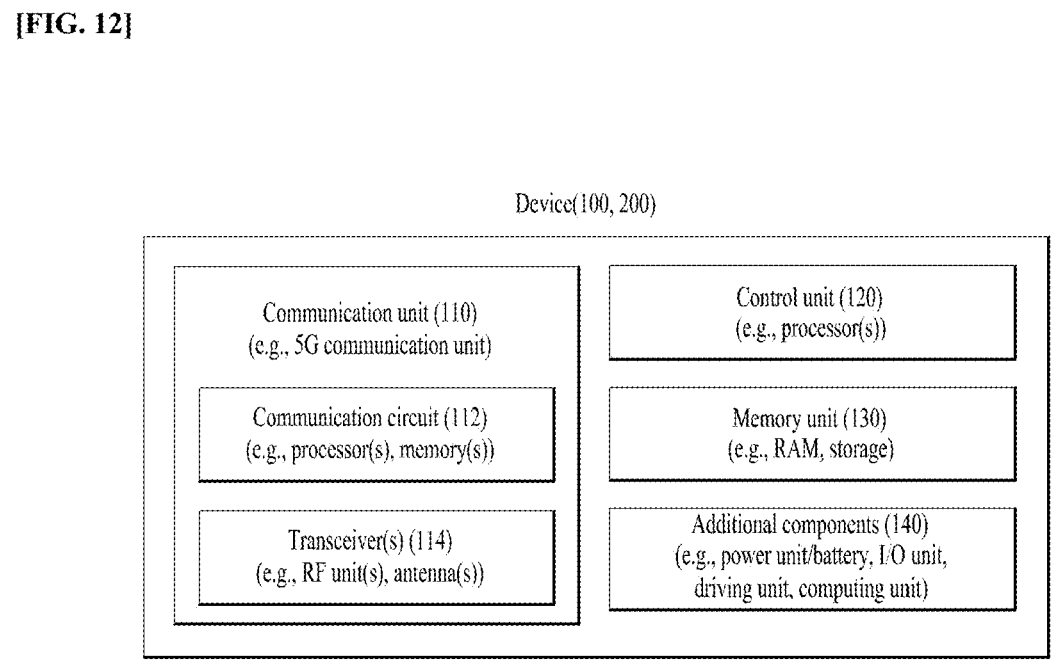

Device(100, 200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

[FIG. 13]
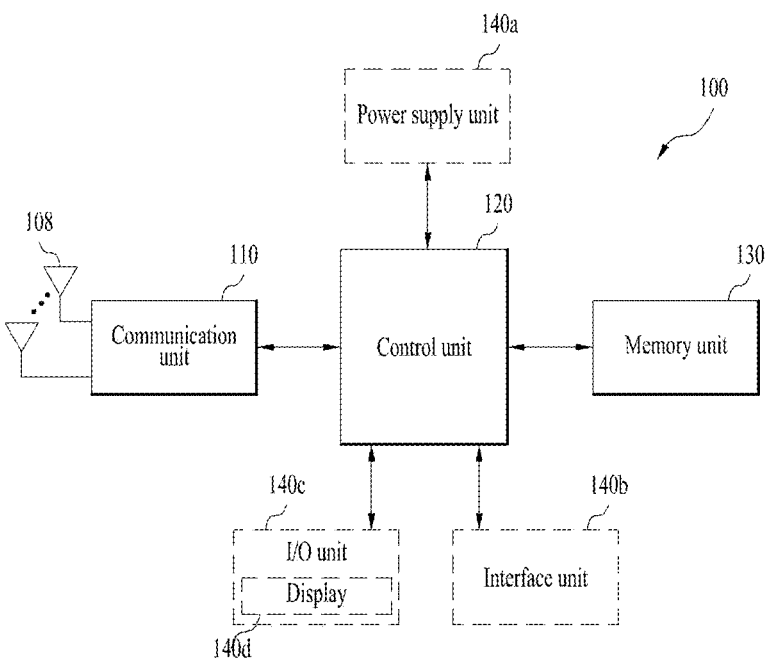
[FIG. 14]
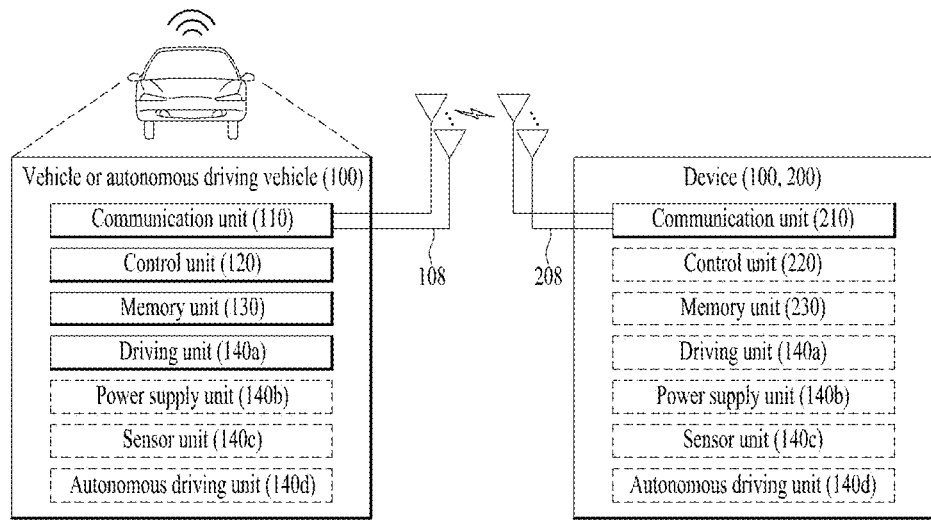

METHOD AND DEVICE FOR TRANSMITTING/RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/005912, filed on May 4, 2020, which claims the benefit of Korean Application No. 10-2019-0052192, filed on May 3, 2019. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DETAILED DESCRIPTION OF THE DISCLOSURE

Technical Problems

Provided are a method and apparatus for efficiently performing a wireless signal transmission and reception process.

The objects to be achieved with the present disclosure are not limited to what has been particularly described hereinabove and other objects not described herein will be more clearly understood by persons skilled in the art from the following detailed description.

Technical Solutions

According to a first aspect of the present disclosure, provided herein is a method of receiving a signal by a user equipment (UE) in a wireless communication system, including receiving a first transport block (TB) on a first semi-persistent scheduling (SPS) resource allocated for an SPS operation, receiving scheduling information indicating retransmission of the first TB, and receiving the first TB on one or more second SPS resources using a hybrid automatic repeat request (HARQ) process associated with the first SPS resource, based on a processing time of the UE.

According to a second aspect of the present disclosure, provided herein is a user equipment (UE) operating in a wireless communication system, including a transceiver and a processor. The processor may be configured to receive a first transport block (TB) on a first semi-persistent scheduling (SPS) resource allocated for an SPS operation, receive scheduling information indicating retransmission of the first TB, and receive the first TB on one or more second SPS resources using a hybrid automatic repeat request (HARQ) process associated with the first SPS resource, based on a processing time of the UE.

According to a third aspect of the present disclosure, provided herein is an apparatus for a user equipment (UE), including at least one processor, and at least one computer memory operably connected to the at least one processor and configured to cause, based on execution, the at least one processor to perform an operation. The operation may include receiving a first transport block (TB) on a first semi-persistent scheduling (SPS) resource allocated for an SPS operation, receiving scheduling information indicating retransmission of the first TB, and receiving the first TB on one or more second SPS resources using a hybrid automatic repeat request (HARQ) process associated with the first SPS resource, based on a processing time of the UE.

According to a fourth aspect of the present disclosure, provided herein is a method of transmitting a signal by a base station (BS) in a wireless communication system, including transmitting a first transport block (TB) on a first semi-persistent scheduling (SPS) resource allocated for an SPS operation, transmitting scheduling information indicating retransmission of the first TB, and retransmitting the first TB on one or more second SPS resources using a hybrid automatic repeat request (HARQ) process associated with the first SPS resource, based on a processing time of the UE.

According to a fifth aspect of the present disclosure, provided herein is a base station (BS) operating in a wireless communication system, including a transceiver and a processor. The processor may be configured to transmit a first transport block (TB) on a first semi-persistent scheduling (SPS) resource allocated for an SPS operation, transmit scheduling information indicating retransmission of the first TB, and retransmit the first TB on one or more second SPS resources using a hybrid automatic repeat request (HARQ) process associated with the first SPS resource, based on a processing time of the UE.

According to a sixth aspect of the present disclosure, provided herein is an apparatus for a base station (BS), including at least one processor, and at least one computer memory operably connected to the at least one processor and configured to cause, based on execution, the at least one processor to perform an operation. The operation may include transmitting a first transport block (TB) on a first semi-persistent scheduling (SPS) resource allocated for an SPS operation, transmitting scheduling information indicating retransmission of the first TB, and retransmitting the first TB on one or more second SPS resources using a hybrid automatic repeat request (HARQ) process associated with the first SPS resource, based on a processing time of the UE.

According to an embodiment, the number of the second SPS resources may be determined based on a period of SPS resources including the first SPS resource and the second SPS resources and on the processing time of the UE.

According to an embodiment, based on the processing time of the UE and the period of the SPS resources which are T and P, respectively, the number X of the second SPS resources may be determined by an equation of X=ceil(T/P).

According to an embodiment, wherein the processing time of the UE may be determined based on a slot offset indicated by a physical downlink shared channel (PDSCH)-to-HARQ feedback timing indicator according to the scheduling information, an interval between a PDSCH scheduled by the scheduling information and a physical uplink control channel (PUCCH) on which HARQ-ACK feedback related to the PDSCH is transmitted, or an interval between a physical downlink control channel (PDCCH) or a control resource set (CORESET), delivering the scheduling information, and HARQ-ACK feedback related to the PDSCH.

According to an embodiment, the method may further include receiving SPS configuration information. The SPS configuration information may include information about a period of SPS resources including the first SPS resource and the second SPS resources and information about the number of HARQ processes configured for the SPS operation.

According to an embodiment, the method may further include determining validity of the SPS configuration information based on the processing time of the UE. It may be determined that the SPS configuration information is valid, based on a value obtained by multiplying the number of the HARQ processes by the period of the SPS resources, which is larger than the processing time of the UE.

Advantageous Effects

According to various embodiments of the present disclosure, radio signals may be efficiently transmitted and received in a wireless communication system.

According to various embodiments of the present disclosure, resources may be more efficiently used by temporarily limiting use of a semi-persistent scheduling (SPS) resource based on a processing time of a UE.

According to various embodiments of the present disclosure, even when an SPS resource is allocated with a relatively short period, a BS may dynamically schedule a separate physical downlink shared channel (PDSCH), without scheduling restrictions generated by an SPS PDSCH, and a UE may receive the dynamically allocated separate PDSCH.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a diagram illustrating a radio frame structure in new RAT (NR);

FIG. 2 is a diagram illustrating a slot structure of an NR frame;

FIG. 3 is a diagram illustrating a self-contained slot structure;

FIG. 4 illustrates an example of PDSCH time domain resource allocation (TDRA) caused by a PDCCH and an example of PUSCH TDRA caused by the PDCCH;

FIG. 5 is a diagram for explaining an example of permitting one HARQ-ACK feedback response in a slot and an example of permitting a plurality of HARQ-ACK feedback responses in a slot;

FIG. 6 is a flowchart illustrating transmission/reception of DL data according to an embodiment of the present disclosure;

FIG. 7 is a flowchart illustrating transmission/reception of DL data according to another embodiment of the present disclosure;

FIGS. 8 and 9 are flowcharts illustrating operations of a UE and a BS according to an embodiment of the present disclosure;

FIG. 10 illustrates a communication system applied to the present disclosure;

FIG. 11 illustrates wireless devices applicable to the present disclosure;

FIG. 12 illustrates another example of wireless devices applied to the present disclosure;

FIG. 13 illustrates a portable device applied to the present disclosure; and

FIG. 14 illustrates a vehicle or an autonomous driving vehicle applied to the present disclosure.

BEST MODE FOR CARRYING OUT THE DISCLOSURE

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems correspond-ing to 3GPP LTE/NR systems, the mobile communication systems are applicable to other arbitrary mobile communi-cation systems except for matters that are specific to the 3GPP LTE/NR system.

For terms and techniques that are not described in detail among terms and techniques used in the present disclosure, reference may be made to 3GPP LTE standard specifica-tions, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communi-cating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Herein-below, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclo-sure, communication with a specific cell may mean com-munication with a BS or a node providing communication services to the specific cell. A DL/UL signal of the specific cell refers to a DL/UL signal from/to the BS or the node providing communication services to the specific cell. A cell providing UL/DL communication services to a UE is espe-cially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state infor-mation reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range config-ured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combi-nation of DL resources and UL resources, that is, a combi-nation of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggrega-tion (CA) is configured, the UE has only one radio resource control (RRC) connection with a network. During RRC connection establishment/re-establishment/handover, one serving cell provides non-access stratum (NAS) mobility information. During RRC connection re-establishment/han-dover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 is a diagram illustrating a radio frame structure in NR.

In NR, UL and DL transmissions are configured in frames. Each radio frame has a length of 10 ms and is defined as two 5-ms half-frames. Each half-frame is defined as five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 2 is a diagram illustrating a slot structure of an NR frame.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 3 illustrates an example of the structure of a self-contained slot.

In an NR system, a frame is characterized by a self-contained structure in which a DL control channel, DL or UL data, a UL control channel, etc., can all be contained in one slot. For example, the first N symbols in a slot may be used to transmit a DL control channel (hereinafter referred to as a DL control area), and the last M symbols in a slot may be used to transmit UL control channels (hereinafter referred to as a UL control area). N and M may each be an integer of 0 or more. A resource area (hereinafter referred to as a data area) between the DL control area and the UL control area may be used for DL data transmission or UL data transmission. For example, the following configuration may be implemented. Each section is listed in chronological order.
1. DL only configuration
2. UL only configuration
3. Mixed UL-DL configuration
DL area+guard period (GP)+UL control area
DL control area+GP+UL area DL area: (i) DL data area, (ii) DL control area+DL data area
UL area: (i) UL data area, (ii) UL data area+UL control area The PDCCH may be transmitted in the DL control region, and the PDSCH may be transmitted in the DL data region. Analogously, in the UL control region, the PUCCH may be transmitted, and in the UL data region, the PUSCH can be transmitted. The PDCCH may transmit Downlink Control Information (DCI), such as, for example, DL data scheduling information, UL data scheduling information, and the like. The PUCCH may transmit Uplink Control Information (UCI), such as, for example, ACK/NACK information, DL CSI information, and Scheduling Request (SR), and the like. The GP provides a time gap in the process of switching from a transmission mode to a reception mode, or switching from the reception mode to the transmission mode. A portion of symbols within a subframe can be set to GP for switching from DL to UL.

Hereinafter, physical channels that may be used in the 3GPP-based wireless communication system will be described in detail.

A PDCCH carries DCI. For example, the PDCCH carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. DCI including resource allocation information about the DL-SCH is referred to as PDSCH scheduling DCI, and DCI including resource allocation information about the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRC is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for an RAR, the CRC is masked with a random access-RNTI (RA-RNTI).

If a PDCCH on one serving cell schedules a PDSCH or a PUSCH of another serving cell, this is referred to as cross-carrier scheduling. Cross-carrier scheduling using a carrier indicator field (CIF) may permit a PDCCH of a serving cell to schedule resources on another serving cell. On the other hand, if a PDSCH on a serving cell schedules the PDSCH or a PUSCH of the serving cell, this is referred to as self-carrier scheduling. If cross-carrier scheduling is used on a cell, the BS may provide information about a cell for scheduling the cell on which cross-carrier scheduling is used to the UE. For example, the BS may provide the UE with information as to whether a serving cell is scheduled by a PDCCH on another (scheduling) cell or by the serving cell or information as to which cell signals DL assignments and UL assignments for the serving cell when the serving cell is scheduled by another (scheduling) cell. In the present disclosure, a cell carrying a PDCCH is referred to as a serving cell, and a cell on which PUSCH or PDSCH transmission is scheduled by DCI included in the PDCCH, i.e., a cell carrying a PUSCH or a PDSCH scheduled by the PDCCH, is referred to as a scheduled cell.

A PDCCH is transmitted through a control resource set (CORESET). One or more CORESETs may be configured for the UE. A plurality of CORESETs for one UE may overlap in the time/frequency domain. The CORESET includes a set of physical resource blocks (PRBs) with a time duration of 1 to 3 OFDM symbols. The CORESET may be configured through system information (e.g., a master inforduration). For example, if monitoringSymbolsWithinSlot is 14 bits, the bits of monitoringSymbolsWithinSlot may represent 14 OFDM symbols of a slot, respectively, such that the most significant (left) bit represents the first OFDM symbol in the slot and the second most significant (left) bit represents the second OFDM symbol in the slot. For example, bit(s) set to 1 among the bits in monitoringSymbolsWithinSlot identify the first symbol(s) of the CORESET in the slot.

Table 3 shows features of each search space type.

TABLE 3

| Search Space Set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding | mation block (MIB)) or a UE-specific higher layer (e.g., RRC layer) signaling. Specifically, the number of PRBs constituting the CORESET and a CORESET duration may be provided to the UE through higher layer (e.g., RRC) signaling.

The UE acquires DCI transmitted through a PDCCH by performing decoding (called blind decoding) on a set of PDCCH candidates. The set of the PDCCH candidates that the UE decodes is defined as a PDCCH search space set. The search space set may be a common search space (CSS) or a UE-specific search space (USS). The UE may acquire the DCI by monitoring PDCCH candidates in one or more search space sets configured by the MIB or higher layer signaling. Each CORESET configuration is associated with one or more search space sets and each search space set is associated with one CORESET configuration. The search space set is determined based on the following parameters provided by the BS to the UE.

controlResourceSetId: Indicator for identifying a CORE-SET associated with a search space set.

monitoringSlotPeriodicityAndOffset: A PDCCH monitoring periodicity (slot unit) and a PDCCH monitoring offset (slot unit).

duration: The number of consecutive slots that a search space lasts in every occasion, i.e., upon every period as indicated by monitoringSlotPeriodicityAndOffset.

monitoringSymbolsWithinSlot: A PDCCH monitoring pattern in a slot, indicating the first symbol(s) of a CORESET in a slot for PDCCH monitoring.

nrofCandidates: The number of PDCCH candidates per control channel element (CCE) aggregation level. The number of PDCCH candidates per AL={1, 2, 4, 8, 16} (one value of 0, 1, 2, 3, 4, 5, 6, and 8).

The UE monitors PDCCH candidates only in PDCCH monitoring occasions. The UE determines the PDCCH monitoring occasions from a PDCCH monitoring periodicity, a PDCCH monitoring offset, and a PDCCH monitoring pattern in a slot. For example, parameter monitoringSymbolsWithinSlot indicates the first symbol(s) for PDCCH monitoring in slots configured for PDCCH monitoring (e.g., refer to parameters monitoringSlotPeriodicityAndOffset and Table 4 below shows DCI formats that a PDCCH may carry.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmission by one or more UEs |

DCI format 0_0 may be used to schedule a transport block (TB)-based (or TB-level) PUSCH, and DCI format 0_1 may be used to schedule the TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule the TB-based (or TB-level) PDSCH or a CBG-based (or CBG-level) PDSCH. In the case of a CSS, DCI format 0_0 and DCI format 1_0 have a fixed size after a BWP size is initially given by RRC. In the case of a USS, in DCI format 0_0 and DCI format 1_0, the size of fields except for the size of a frequency domain resource assignment (FDRA) field is fixed, whereas the size of the FDRA field may be changed through a related parameter configuration by the BS. In DCI format 0_1 and DCI format 1_1, the size of a DCI field may be changed through various RRC reconfigurations by the BS. DCI format 2_0 may be used to transfer dynamic slot format information (e.g., slot format indicator (SFI) DCI) to the UE, and DCI format 2_1 may be used to transfer DL preemption information to the UE. DCI format 2_0 and/or DCI format 2_1 may be transmitted to UEs in a related group through a group common PDCCH, which is a PDCCH transmitted to UEs defined as one group.

A PDSCH is a physical layer DL channel for DL data transport. The PDSCH carries DL data (e.g., DL-SCH TB)

and is subjected to modulation such as quadrature phase shift keying (QPSK), 16 quadrature amplitude modulation (QAM), 64 QAM, 256 QAM, etc. A codeword is generated by encoding a TB. The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)—acknowledgment (ACK): A response to a DL data packet (e.g., codeword) on a PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), and a layer indicator (LI). The CSI may be divided into CSI part 1 and CSI part 2 according to UCI type included in the CSI. For example, the CRI, the RI, and/or the CQI for the first codeword may be included in CSI part 1, and the LI, the PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource:

an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted. The UCI is represented as the product of a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped in the form of frequency division multiplexing (FDM) within the same symbol. The UE transmits the UCI by applying only inverse fast Fourier transform (IFFT) without discrete Fourier transform (DFT) to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

. . .

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5).

Configuration for each PUCCH resource includes a PUCCH resource index, a start PRB index, and a configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If SR and CSI are given as the UCI type, a PUCCH resource to be used for UCI transmission in a PUCCH resource set may be configured by a network for the UE through higher layer signaling (e.g., RRC signaling). If HARQ-ACK for a semi-persistent scheduling (SPS) PDSCH is given as the UCI type, the PUCCH resource to be used for UCI transmission in the PUCCH resource set may be configured by the network for the UE through higher layer signaling (e.g., RRC signaling). On the other hand, if HARQ-ACK for a PDSCH scheduled by DCI is given as the UCI type, the PUCCH resource to be used for UCI transmission in the PUCCH resource set may be scheduled based on the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI through (UE-specific) higher layer (e.g., RRC) signaling for the UE. The ARI may indicate a PUCCH resource subset in the PUCCH resource set, and which PUCCH resource in the indicated PUCCH resource subset is to be used may be determined according to an implicit rule based on transmission resource information about the PDCCH (e.g., a starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in an RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a C-RNTI. The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a period of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured period through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a period of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured period through RRC signaling until deactivation.

Hereinafter, resource allocation by the PDCCH and resource allocation by RRC will be described in more detail. Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

FIG. 4 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaling pdsch-TimeDomainAllocationList is applied as the allocation table for the PDSCH. Predefined default PUSCH time domain allocation is applied as the allocation table for the PDSCH or a PUSCH TDRA table that the BS configures through RRC signaling pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a DMRS is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;

periodicity corresponding to a period of configured grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively, (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a period of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:

[(SFN*numberOfSlotsPerFrame*numberOfSymbolsPerSlot)+(slot number in the frame*numberOfSymbolsPerSlot)+symbol number in the slot]=[(SFNstart time*numberOfSlotsPerFrame*numberOfSymbolsPerSlot+$slot_{start\ time}$*numberOfSymbolsPerSlot+$symbol_{start\ time}$)+N*periodicity] modulo (1024*numberOfSlotsPerFrame*numberOfSymbolsPerSlot), for all N>=0, where SFNstart time, $slot_{start\ time}$, and $symbol_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively, (refer to Table 1 and Table 2).

On DL, the UE may be configured with SPS per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFNstart time+$slot_{start\ time}$)+N*periodicity*numberOfSlotsPerFrame/10] modulo (1024*numberOfSlotsPerFrame), where SFNstart time and $slot_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively, (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block allocation, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

FIG. 5 is a diagram for explaining an example of permitting one HARQ-ACK feedback response in a slot and an example of permitting a plurality of HARQ-ACK feedback responses in a slot.

When stringent latency and high reliability, such as a URLLC service, are needed, if HARQ-ACK feedback corresponding to a plurality of PDSCHs configures a HARQ-ACK codebook of a PUCCH transmitted in one slot according to the NR Rel-15 standard, as illustrated in (a) of FIG. 5, a HARQ-ACK payload size is relatively increased and then transmission performance of the PUCCH may be degraded. Furthermore, in order to support a latency-critical service, the BS may be required to repeatedly transmit a plurality of PDSCHs with a short duration even in a slot. Although a plurality of PDSCHs is transmitted by scheduling of the BS, if only one HARQ-ACK PUCCH transmission is permitted in the slot, HARQ-ACK feedback transmission for back-to-back scheduling may be relatively delayed. Accordingly, for flexible and efficient use of resources, support of services, and faster and robust UL channel transmission, PUCCHs (or PUSCHs) including a plurality of HARQ-ACK responses in a slot, need to be transmitted.

A next-generation system aims at using a wide frequency band and supporting various services and requirements. As an example, URLLC, which is one of representative scenarios of NR, requires low-latency and ultra-reliability having a user-plane latency of 0.5 ms and X-byte data transmission within 1 ms at an error rate of $10^{-5}$ or less. Generally, eMBB has a large traffic capacity, whereas URLLC traffic has a traffic size within a few tens to a few hundred bytes and is sporadic. Thus, eMBB and URLLC have different characteristics. Therefore, transmission for maximizing transmission rate and minimizing control information overhead is required for eMBB and a transmission method having a short scheduling time unit and reliability is required for URLLC.

A variety of reference time units may be assumed/used to transmit and receive physical channels according to an application field or traffic type. The reference time unit may be a basic unit for scheduling a specific physical channel and may vary with the number of symbols constituting the basic unit and/or with a subcarrier spacing (SCS). In an embodiment of the present disclosure, a slot and a mini-slot are described as the reference time unit, for convenience of description. The slot may be, for example, a basic scheduling unit used for normal data traffic (e.g. eMBB). The mini-slot may be a shorter time duration than the slot in the time domain and may be a basic scheduling unit used in traffic or communication schemes for a special purpose such as URLLC, unlicensed bands, or millimeter wave. However, the slot and the mini-slot are not limited to the above examples and the present disclosure may be extended even to the case in which eMBB transmits and receives a physical channel based on the mini-slot or the case in which URLLC or other communication schemes transmit and receive the physical channel based on the slot.

PROPOSED EMBODIMENT

The present disclosure proposes a method of temporarily limiting use of an SPS PDSCH in consideration of a processing time necessary for HARQ-ACK feedback transmission, in a process in which a UE receives a PDSCH periodically allocated by a BS through an SPS and transmits HARQ-ACK feedback for the received PDSCH. Specifically, various embodiments of the present disclosure propose methods in which the UE and the BS temporarily do not use a part of an SPS PDSCH based on a processing time of the UE or the UE and the BS use the SPS PDSCH by making an assumption different from an existing assumption. According to various embodiments of the present disclosure, the UE may receive DL data by being dynamically assigned a separate PDSCH without any problem even when the UE receives an SPS PDSCH of a short period allocated by the BS. In addition, the BS may dynamically assign the UE the separate PDSCH without scheduling restrictions generated by the SPS PDSCH.

For convenience of description, the present specification discloses a PDSCH, which is used mainly for DL, and an SPS, which is one of methods used upon scheduling the PDSCH, and describes implementation examples of the PDSCH and the SPS. However, the present disclosure may be applied even to any case in which the UE exchanges L1 signaling and/or higher layer signaling with the BS in order for the BS to previously indicate or configure DL reception or UL transmission (especially, periodic reception and transmission) to or for the UE.

FIG. 6 is a flowchart illustrating transmission/reception of DL data according to an embodiment of the present disclosure.

1. A network (e.g., at least one BS) allocates a DL resource that occurs periodically to the UE through an SPS method (S1001A).
2. The UE may receive a message for receiving the DL resource that is allocated periodically from the network (S1001A). In this case, the UE may determine the validity of the message based on a period of a resource configured or indicated by the message received from the network, a required processing time, etc. (S1002A).
3. If the message is invalid, the UE may drop or ignore the message. However, when the message is valid, the UE may use the periodically generated DL resource for DL data transmission based on the message (S1003A). According to an embodiment, the UE may not expect to receive an invalid SPS configuration message. In this case, since the UE does not expect to receive the invalid message, the UE may use the DL resource to transmit DL data under the assumption that the DL resource is periodically generated according to the message (S1003A).

FIG. 7 is a flowchart illustrating transmission/reception of DL data according to another embodiment of the present disclosure.

When a HARQ process ID used in a DL resource given through an SPS method is used for dynamic scheduling (e.g., scheduling through DCI), the UE may not use an SPS resource associated with the HARQ process ID during a predetermined time.

In this case, the time during which the UE does not use the SPS resource may be determined based on a PDSCH processing time required for the UE. The PDSCH processing time may mean a time required to process a PDSCH received from the BS. For example, while the PDSCH processing time may include a time consumed to transmit HARQ-ACK feedback for the received PDSCH to the BS or a time consumed to transmit the HARQ-ACK feedback for the received PDSCH to the BS and receive a response to the HARQ-ACK feedback from the BS, the PDSCH processing time is not limited thereto. From the viewpoint of the BS, if the HARQ process ID used in the DL resource allocated through the SPS method is used for dynamic scheduling, the BS may not use the SPS resource associated with the HARQ process ID during a predetermined time. In this case, the time during which the BS does not use the SPS resource may be determined based on the PDSCH processing time required for the UE.

The disclosure of FIG. 6 may be applied together with or independently of the disclosure of FIG. 7. For example, when the SPS configuration message in FIG. 6 is valid, the disclosure of FIG. 7 may be implemented together with the disclosure of FIG. 6. As another example, only the disclosure of FIG. 7 may be implemented without checking the validity of the SPS configuration message or by considering that the SPS configuration message is valid. Hereinafter, implementation/application examples of the present disclosure will be described in detail. The proposed techniques to be described may be applied in combination with each other.

[Proposed Technique 1]

When the BS may allocate an SPS resource to the UE through L1 signaling (e.g., DCI) and/or higher layer signaling (e.g., an RRC message), and UE may receive the allocated SPS resource (i.e., the UE may receive a transport block (TB) on the allocated SPS resource) and transmit HARQ-ACK feedback for the received TB, the UE may determine the validity of an SPS configuration/indication based on a processing time required for PDSCH reception (or a processing time of the UE), and may drop or ignore an invalid SPS configuration/indication. Alternatively, according to an embodiment, the UE may not assume that the invalid SPS configuration/indication is received. For example, when an interval between SPS resources using the same HARQ process ID is smaller than a preset time T, the UE may determine that the configuration/indication of the BS indicating the corresponding SPS resource is invalid. The processing time of the UE may mean a time required to process the received PDSCH. For example, while the processing time may include a time used to transmit HARQ-ACK feedback for the received PDSCH to the BS or a time used to transmit the HARQ-ACK feedback for the received PDSCH to the BS and receive a response to the HARQ-ACK feedback from the BS, the processing time is not limited thereto. In this case, the preconfigured time T may be determined based on the processing time of the UE. More specifically, when an SPS configuration satisfies a condition of (periodicity)*(nrofHARQ-Processes)≤T, the UE and/or the BS may determine that the corresponding SPS configuration is an invalid configuration. In this case, periodicity and nrofHARQ-Processes may mean the period of an SPS resource and the number of HARQ processes used for SPS, respectively, as described above and may be delivered to the UE through RRC signaling. The UE expects that a new TB will always be transmitted on an SPS PDSCH. Accordingly, upon receiving a TB on an SPS resource using a specific HARQ process ID, the UE flushes a buffer of a corresponding HARQ process. Therefore, if an SPS resource using the same HARQ process ID occurs again before a previously received TB is processed, the previously received TB is also deleted. In order to solve the above problem, when an interval between SPS resources using the same HARQ process ID is smaller than the time T determined based on the processing time of the UE, the UE may determine that a configuration of the BS to allocate a corresponding SPS resource is invalid and may drop or ignore a configuration that is determined to be invalid. In this case, specifically, the UE and/or the BS may determine the time T based on the following options.

1. Option 1: The time T may be set to the capability of the UE or to the smallest PDSCH processing time obtainable through the capability of the UE.
2. Option 2: The time T may be indicated/configured through L1 signaling and/or higher layer signaling of the BS or may be a previously promised/defined value.

Option 2-1: The time T may be a slot offset indicated by a PDSCH-to-HARQ feedback timing indicator indicated by DL allocation through L1 signaling.

Option 2-2: The time T may be a time interval between an ending timing of a PDSCH indicated through L1 signaling and a starting timing of a PUCCH on which HARQ-ACK feedback for the received PDSCH is transmitted.

Option 2-3: The time T may be a time interval between an ending timing (or starting timing) of a PDCCH or CORESET used for scheduling a PDSCH and a starting timing (or ending timing) of a PUCCH on which HARQ-ACK feedback for the PDSCH is transmitted.

In this case, while the time T may be expressed as an integer multiple of a period according to SPS configuration, the time T is not limited thereto.

[Proposed Technique 2]

When the BS may allocate an SPS resource to the UE through L1 signaling and/or higher layer signaling, and the UE may receive the allocated SPS resource (i.e., a TB on the allocated SPS resource) and transmit HARQ-ACK feedback for the received TB, the UE may expect that retransmission of the TB received on the allocated SPS resource is indicated through DL allocation (e.g., DL allocation through a PDCCH). However, if an SPS resource associated with the same HARQ process ID (or an SPS resource using the same HARQ process ID) occurs again before retransmission indicated by DL allocation is completed, the UE should flush an associated HARQ buffer, before transmission of the TB is ended, and receive a new TB on the SPS resource. In this case, as a result of invalidating transmission before the HARQ buffer is flushed, radio resources may be wasted and the performance of a system may be degraded. In order to solve the above problem, a method of performing retransmission for the same TB on the SPS resource during a predetermined time may be considered. When retransmission for the same TB is performed on the SPS resource during a predetermined time, an SPS PDSCH may be retransmitted without overhead due to a separate PDCCH while reducing the complexity of the UE caused by use of consecutive repeated transmissions. Specifically, the UE may expect that the BS will transmit a PDSCH for the same TB on X SPS PDSCHs associated with the same HARQ process ID. That is, the UE may assume that a TB received on the first SPS resource among X SPS resources associated with the same HARQ process ID is a new transmission and assume that TBs received on the next X–1 SPS resources associated with the same HARQ ID is retransmission. For example, the UE may assume that a new data indicator (NDI) in DCI has been toggled only on the first SPS resource among the X SPS resources associated with the same HARQ process ID and assume that the NDI has not been toggled on the X–1 SPS resource associated with the same HARQ process ID. In this case, X may be indicated or configured through L1 signaling and/or higher layer signaling of the BS or may be a previously promised or defined value. Alternatively, according to an embodiment, X may be a value determined based on a PDSCH processing time T of the UE and a period P of an SPS resource. For example, X may be a value determined by an equation of X=ceil(T/P) but is not limited thereto.

In addition, the PDSCH processing time T may be determined as follows. The time T may mean the capability of the UE or the smallest PDSCH processing time obtainable through the capability of the UE. The time T may be indicated/configured through L1 signaling and/or higher layer signaling of the BS or may be a previously promised/defined value. For example, the time T may be determined as a slot offset indicated by a PDSCH-to-HARQ feedback timing indicator indicated by DL allocation through L1 signaling. Alternatively, according to an embodiment, the time T may be determined as a time interval between an ending timing of a PDSCH indicated through L1 signaling and a starting timing of a PUCCH on which HARQ-ACK feedback for the received PDSCH is transmitted. Alternatively, the time T may be a time interval between an ending timing (or starting timing) of a PDCCH or CORESET used for indicating a PDSCH and a starting timing (or ending timing) of a PUCCH on which HARQ-ACK feedback for the PDSCH is transmitted. In this case, the time T may be expressed as an integer multiple of a period configured by an SPS configuration message. The X SPS PDSCHs may be selected based on a specific system frame number (SFN) (e.g., SFN=0).

[Proposed Technique 3]

When the BS may allocate an SPS resource to the UE through L1 signaling and/or higher layer signaling, and the UE may receive the allocated SPS resource (i.e., a TB on the allocated SPS resource) and transmit HARQ-ACK feedback for the received TB, the UE may expect that retransmission of the TB received on the SPS resource is indicated through DL allocation (e.g., DL allocation through a PDCCH). However, if an SPS resource associated with the same HARQ process ID occurs again before retransmission indicated by DL allocation is completed, the UE should flush an associated HARQ buffer, before transmission of the TB is ended, and receive a new TB on the SPS resource. In this case, as a result of invalidating transmission before the HARQ buffer is flushed, radio resources may be wasted and the performance of a system may be degraded. In order to solve the above problem, a method in which the UE does not use an SPS resource associated with a HARQ process ID indicated by corresponding DL allocation upon receiving DL allocation. More specifically, when the UE receives DL allocation indicating a HARQ process ID used on an SPS
resource, it may be expected that the UE will not use an SPS
resource associated with the same HARQ process ID during
a predetermined time duration T. In this case, the UE and/or
the BS may determine the time duration T based on the
following options.

1. Option 1: The time duration T may mean the capability
of the UE or the smallest PDSCH processing time
obtainable through the capability of the UE, from a
timing at which DL allocation is received (e.g., a
starting timing or an ending timing of a PDCCH or a
CORESET receiving DL allocation).

2. Option 2: The time duration T may be indicated/
configured through L1 signaling and/or higher layer
signaling of the BS or may be a previously promised/
defined value, from a timing at which DL allocation is
received.

Option 2-1: The time duration T may be a slot offset
indicated by a PDSCH-to-HARQ feedback timing indi-
cator indicated by DL allocation through L1 signaling.

Option 2-2: The time duration T may be a time interval
between an ending timing of a PDSCH indicated
through L1 signaling and a starting timing of a PUCCH
on which HARQ-ACK feedback for the PDSCH is
transmitted.

Option 2-3: The time duration T may be a time interval
between an ending timing (or starting timing) of a
PDCCH or CORESET used for indicating a PDSCH
and a starting timing (or ending timing) of a PUCCH on
which HARQ-ACK feedback for the PDSCH is trans-
mitted.

Option 2-4: The time duration T may be a time interval
between an ending timing (or starting timing) of a
PDCCH or CORESET used for indicating a PDSCH
and a starting timing (or ending timing) of a PUCCH on
which HARQ-ACK feedback for indicating transmis-
sion success of a corresponding TB is transmitted.

In this case, the time duration T may be expressed as a
multiple of a period according to SPS configuration.

The UE and the BS may use a plurality of time intervals
$T\_1, T\_2, \ldots, T\_N$. When a plurality of time intervals is
used, the UE may expect not to use an SPS resource
associated with a corresponding HARQ process ID only at
the intersection or union of the given time intervals. Alter-
natively, according to an embodiment, the UE may expect
not to use the SPS resource associated with the correspond-
ing HARQ process ID until a time interval that ends first
among the given time intervals. The above-described opera-
tion may be performed through a timer used in a higher
layer. For example, the UE may start or restart a timer that
expires after a time interval T after the start of each HARQ
process, at a timing when DL allocation is received, and may
not use an SPS resource associated with a specific HARQ
process before the timer expires. The UE may have a
plurality of timers having different trigger conditions for
respective HARQ processes. In this case, the above opera-
tion may be differently performed according to an RNTI or
DCI format used for CRC detection when the UE receives
DL allocation. For example, the UE may perform the above
operation only upon receiving DL allocation using a specific
RNTI (e.g., C-RNTI or CS-RNTI). Alternatively, the UE
may perform the above operation only upon receiving DL
allocation using a specific DCI format (e.g., URLLC DCI
format or DCI format 0_0). This is to protect reception of a
PDSCH allocated through specific DCI from reception of an
SPS resource and to prevent collision between the two
resources.

FIGS. 8 and 9 are flowcharts illustrating operations of a
UE and a BS according to an embodiment of the present
disclosure.

Referring to FIG. 8, the UE according to an embodiment
receives a first TB on a first SPS resource allocated for an
SPS operation (S800). The UE may receive SPS configu-
ration information from the BS for a configuration necessary
for the SPS operation. The SPS configuration information
may include, without being limited to, information about
allocation of an SPS resource, a period of the SPS resource,
and the number of HARQ processes used on the SPS
resource. The above information may be received through
one message or a plurality of messages. The SPS configu-
ration information may be received through L1 signaling
and/or higher layer signaling (e.g., RRC signaling). The UE
may receive the TB on an SPS resource periodically allo-
cated by the SPS configuration information. For example,
the periodically allocated SPS resource may include the first
SPS resource, and the UE may receive the first TB on the
first SPS resource.

The UE receives scheduling information indicating
retransmission of the first TB (S810). The scheduling infor-
mation may mean dynamic scheduling information (e.g.,
scheduling information through a PDCCH).

If decoding of the first TB received on the first SPS
resource fails, the UE may transmit NACK information to
the BS and perform retransmission of the first TB. In this
case, the UE may receive the scheduling information indi-
cating retransmission of the first TB. The scheduling infor-
mation indicating retransmission of the first TB may be
transmitted through the PDCCH.

The UE receives the first TB on one or more second SPS
resources using a HARQ process associated with the first
SPS resource based on a processing time of the UE (S820).
When decoding of the first TB received on the first SPS
resource fails, retransmission of the first TB may be per-
formed. According to an embodiment, retransmission of the
first TB received on the first SPS resource may be performed
using the HARQ process associated with the first SPS
resource (e.g., HARQ process #1). However, in the case of
SPS transmission, the UE flushes a buffer of a corresponding
HARQ process whenever an SPS resource associated with
the same HARQ process appears, and the UE receives a new
TB. Therefore, if the SPS resource associated with the
HARQ process #1 (e.g., a second SPS resource) appears
again before retransmission of the first TB performed in
HARQ process #1 is completed, a buffer of the HARQ
process #1 is flushed so that transmission of the first TB,
which has already been performed, may be meaningless.
Accordingly, the UE may receive the first TB without
receiving a new TB during a predetermined time on the
second SPS resource using the HARQ process #1 in con-
sideration of a processing time of the UE. In this case, the
first TB received on the second SPS resource may be the
retransmitted first TB. The predetermined time during which
retransmission of the first TB is performed on the second
SPS resource may be determined based on the processing
time of the UE, and one or more second SPS resources may
be included during the predetermined time. In this case, the
number of second SPS resources on which retransmission of
the first TB is performed may be determined based on the
period of the SPS resource and the processing time of the
UE. For example, when the processing time of the UE is T
and the period of the SPS resource is P, the number X of the
second SPS resources may be determined by an equation of
$X=\text{ceil}(T/P)$ but is not limited thereto. In addition, the
processing time of the UE may be determined based on a slot offset indicated by a PDSCH-to-HARQ feedback timing indicator according to dynamic scheduling information, an interval between a PDSCH scheduled by dynamic scheduling information and a PUCCH on which HARQ-ACK feedback corresponding to the PDSCH is transmitted, or an interval between a PDCCH or a CORESET carrying the dynamic scheduling information and HARQ-ACK feedback corresponding to the PDSCH, but is not limited thereto.

In addition, the UE according to an embodiment may determine the validity of the SPS configuration information received from the BS based on the processing time of the UE. For example, when a condition of (periodicny)*(nrof-HARQ-Processes)≤T is satisfied, the UE may determine that the received SPS configuration information is invalid. As described above, periodicity and nrofHARQ-Processes may mean the period of the SPS resource and the number of HARQ processes used for SPS, respectively, and may be delivered to the UE through RRC signaling. If it is determined that the received SPS configuration information is invalid, the UE may drop or ignore the received SPS configuration information.

Referring to FIG. 9, the BS according to an embodiment transmits a first TB to the UE on a first SPS resource allocated for an SPS operation (S900). The BS may transmit SPS configuration information to the UE for a configuration necessary for the SPS operation. The SPS configuration information may include information about allocation of an SPS resource, a period of the SPS resource, and the number of HARQ processes used on the SPS resource.

The BS transmits scheduling information indicating retransmission of the first TB to the UE (S910). If decoding of the first TB transmitted on the first SPS resource fails, the BS may receive NACK information from the UE and perform retransmission of the first TB. The BS may transmit the scheduling information for scheduling retransmission of the first TB to the UE, and the scheduling information may mean dynamic scheduling information (e.g., scheduling information by a PDCCH).

The BS transmits the first TB on one or more second SPS resources using a HARQ process associated with the first SPS resource based on a processing time of the UE (S920). The number of second SPS resources on which retransmission of the first TB is performed may be determined based on the period of the SPS resource and the processing time of the UE. For example, when the processing time of the UE is T and the period of the SPS resource is P, the number X of the second SPS resource may be determined by an equation of X=ceil(T/P), but is not limited thereto. Accordingly, the UE and the BS may prevent a buffer of a HARQ process related to the SPS resource from being flushed, before processing of a TB received on the SPS resource is completed, and use radio resources more efficiently.

While the operation of the above proposals or disclosure has been described in terms of the "UE" or "BS", the operation may be performed or implemented by a transmission or reception device, a (digital signal) processor, a microprocessor, etc., which will be described later, instead of the "UE" and "BS". "UE" may be used interchangeably with a mobile device such as a mobile station (MS), a user equipment (UE), or a mobile terminal as a general term, and "BS" may be used interchangeably with a device such as a base station (BS), an evolved NodeB (eNB), a next generation eNode B (ng-eNB), or a next generation NodeB (gNB) as a general term.

Examples of the above-described proposed methods may also be included in one of implementation methods of the present disclosure and, therefore, it is obvious that the examples are regarded as the proposed methods. In addition, although the above-described proposed methods may be independently implemented, the proposed methods may be implemented in the form of a combination (or aggregate) of some of the proposed methods. A rule may be defined such that information as to whether the proposed methods are applied (or information about rules of the proposed methods) may be indicated to the UE by the BS through a predefined signal (e.g., physical layer or higher layer signal). The proposed methods described in the embodiments of the present disclosure and methods extensible from the proposed methods may be implemented as a device, and the present disclosure includes the contents of the implemented device. The device will be described below with reference to the attached drawings.

Various descriptions, functions, procedures, proposals, methods, and/or operational flowcharts disclosed in the present disclosure may be applied to a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 10 illustrates a communication system applied to the present disclosure.

Referring to FIG. 10, the communication system (1) applied to the present disclosure includes wireless devices, base stations (BSs), and a network. The wireless devices refer to devices performing communication by radio access technology (RAT) (e.g., 5G New RAT (NR) or LTE), which may also be called communication/radio/5G devices. The wireless devices may include, but no limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured by using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 11 illustrates wireless devices applicable to the present disclosure.

Referring to FIG. 11, a first wireless device 100 and a second wireless device 200 may transmit radio signals through a variety of RATs (e.g., LTE and NR). Here, the {first wireless device 100, second wireless device 200} may correspond to the {wireless device 100x, BS 200} and/or {wireless device 100x, wireless device 100x} of FIG. 10.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 12 illustrates another example of wireless devices applied to the present disclosure. The wireless devices may be implemented in various forms according to use-cases/services (refer to FIG. 10).

Referring to FIG. 12, wireless devices 100 and 200 may correspond to the wireless devices 100 and 200 of FIG. 11 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcasting terminal, a hologram device, a public safety device, an MTC device, a medicine device, a FinTech device (or a finance device), a security device, a climate/environment device, the AI server/device (400 of FIG. 10), the BSs (200 of FIG. 10), a network node, etc. The wireless device may be mobile or fixed according to a use-case/service.

In FIG. 12, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 12 will be described in detail with reference to the drawings.

FIG. 13 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 13, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 12, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

FIG. 14 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain vehicle state information and/or ambient environment information. The autonomous driving unit 140d may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is mainly made of a data transmission and reception relationship between a BS and a UE. This transmission and reception relationship is extended in the same/similar manner to signal transmission and reception between a UE and a relay or between a BS and a relay. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with a fixed station, a Node B, an eNode B (eNB), gNode B (gNB), an access point, etc. Further, the term UE may be replaced with a UE, a mobile station (MS), a mobile subscriber station (MSS), etc.

The embodiments of the present disclosure may be implemented through various means, for example, hardware, firmware, software, or a combination thereof. In a hardware configuration, an embodiment of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, and so on which performs the above-described functions or operations. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other equipment in a wireless mobile communication system.

The invention claimed is:

1. A method comprising:
receiving configuration information related to semi-persistent scheduling (SPS), wherein the configuration information includes information related to a periodicity for the SPS and information related to the number of hybrid automatic repeat request (HARQ) processes configured for the SPS;
receiving a downlink data based on the configuration information;
receiving downlink control information (DCI) for scheduling retransmission of the downlink data; and
receiving the retransmission of the downlink data based on a validity of the configuration information,
wherein the configuration information is determined as valid, based on a value obtained by multiplying the number of the HARQ processes by the periodicity, which is greater than a processing time for the DCI.

2. The method of claim 1,
wherein the number of one or more resources based on the configuration information is determined based on the periodicity and the processing time.

3. The method of claim 2,
wherein, based on the processing time and the periodicity which are T and P, respectively, the number X of the one or more resources is determined by an equation of X=ceil(T/P).

4. A user equipment (UE) comprising:
a memory storing instructions;
a transceiver; and
a processor,
wherein the processor is configured to execute the instructions to perform operations comprising:
receiving configuration information related to semi-persistent scheduling (SPS), wherein the configuration information includes information related to a periodicity for the SPS and information related to the number of hybrid automatic repeat request (HARQ) processes configured for the SPS,
receiving a downlink data based on the configuration information,
receiving downlink control information (DCI) for scheduling retransmission of the downlink data, and
receiving the retransmission of the downlink data based on a validity of the configuration information,
wherein the configuration information is determined as valid, based on a value obtained by multiplying the number of the HARQ processes by the periodicity, which is greater than a processing time for the DCI.

5. An apparatus for a user equipment, the apparatus comprising:
at least one processor; and
at least one computer memory operably connected to the at least one processor and configured to cause, based on execution, the at least one processor to perform operations comprising:
receiving configuration information related to semi-persistent scheduling (SPS), wherein the configuration information includes information related to a periodicity for the SPS and information related to the number of hybrid automatic repeat request (HARQ) processes configured for the SPS,
receiving a downlink data based on the configuration information,
receiving downlink control information (DCI) for scheduling retransmission of the downlink data, and
receiving the retransmission of the downlink data based on a validity of the configuration information,
wherein the configuration information is determined as valid, based on a value obtained by multiplying the number of the HARQ processes by the periodicity, which is greater than a processing time for the DCI.

* * * * *